United States Patent
Hertlein et al.

(10) Patent No.: US 12,325,397 B2
(45) Date of Patent: Jun. 10, 2025

(54) BRAKING SYSTEM WITH PEDAL FEEDBACK

(71) Applicant: Dr. Ing. h.c. F. Porsche Aktiengesellschaft, Stuttgart (DE)

(72) Inventors: Günther Hertlein, Kirchberg (DE); Michael Kurz, Pliezhausen (DE); Bernhard Schweizer, Eutingen-Rohrdorf (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/137,507

(22) Filed: Apr. 21, 2023

(65) Prior Publication Data

US 2023/0365105 A1 Nov. 16, 2023

(30) Foreign Application Priority Data

May 16, 2022 (DE) ...................... 10 2022 112 186.0

(51) Int. Cl.
*B60T 7/04* (2006.01)
*B60T 8/176* (2006.01)
*G05G 5/03* (2008.04)

(52) U.S. Cl.
CPC .............. *B60T 7/042* (2013.01); *B60T 8/176* (2013.01); *G05G 5/03* (2013.01); *B60T 2270/82* (2013.01)

(58) Field of Classification Search
CPC ....................................................... B60T 8/176
See application file for complete search history.

(56) References Cited

U.S. PATENT DOCUMENTS

| 9,415,758 B2 | 8/2016 | Drumm et al. |
| 9,845,085 B2 | 12/2017 | Besier et al. |

(Continued)

FOREIGN PATENT DOCUMENTS

| DE | 19757379 A1 * | 6/1999 | .............. F02D 11/02 |
| DE | 112006001284 T5 * | 3/2008 | ............... G05G 1/38 |

(Continued)

OTHER PUBLICATIONS

USPTO Machine Translation (retrieved from FIT database) of the Description of KR 20140139119 A, Rothkopf et al., Dec. 4, 2014. (Year: 2024).*

(Continued)

*Primary Examiner* — Daniel D Yabut
(74) *Attorney, Agent, or Firm* — Buchanan Ingersoll & Rooney PC

(57) ABSTRACT

A brake-by-wire system for a motor vehicle provides haptic feedback to the driver via the brake pedal in the event of an anti-lock braking. The brake system includes a brake pedal configured to receive a braking request from a driver driving the motor vehicle and to forward the request to a braking apparatus. The braking apparatus is configured to translate the braking request into a corresponding brake pressure and to transmit it to brake actuators. The brake pedal is further mechanically and/or hydraulically decoupled from the braking apparatus. The brake system has at least one mechanical actuator in the form of a unbalance motor and/or a magnetic plunger. The at least one mechanical actuator is connected to the brake pedal and is configured to induce the brake pedal to vibrate in the event of an anti-lock braking.

17 Claims, 1 Drawing Sheet

(56) References Cited

U.S. PATENT DOCUMENTS

| | | | |
|---|---|---|---|
| 10,479,335 B2 | 11/2019 | Kuhlman et al. | |
| 2007/0245844 A1* | 10/2007 | Yokoyama | B60T 7/042 |
| | | | 74/512 |
| 2015/0197229 A1 | 7/2015 | Knechtges et al. | |
| 2017/0225664 A1 | 8/2017 | Beever | |
| 2018/0056956 A1* | 3/2018 | Kim | B60T 7/042 |
| 2018/0257613 A1 | 9/2018 | White et al. | |
| 2019/0193701 A1 | 6/2019 | Kuhlman et al. | |
| 2020/0070792 A1* | 3/2020 | Bauer | B60T 8/4081 |

FOREIGN PATENT DOCUMENTS

| | | | | |
|---|---|---|---|---|
| DE | 102009054650 A1 * | 6/2011 | | B60K 26/021 |
| DE | 102013204778 A1 | 9/2013 | | |
| DE | 102012025247 A1 | 6/2014 | | |
| DE | 102013222281 A1 | 11/2014 | | |
| DE | 102017214828 A1 | 3/2018 | | |
| DE | 102017213620 A1 | 2/2019 | | |
| DE | 102018220578 A1 | 6/2019 | | |
| DE | 102018220544 A1 | 6/2020 | | |
| EP | 1864875 A1 | 12/2007 | | |
| EP | 3178712 A1 * | 6/2017 | | B60T 11/10 |
| KR | 20140088246 A * | 7/2014 | | G05G 5/03 |
| KR | 20140139119 A * | 12/2014 | | |
| WO | WO-2018123364 A1 * | 7/2018 | | B60K 26/02 |

OTHER PUBLICATIONS

USPTO Machine Translation (retrieved from FIT database) of the Description of DE 102009054650 A1, Schmitt et al., Jun. 16, 2011. (Year: 2024).*

* cited by examiner

BRAKING SYSTEM WITH PEDAL FEEDBACK

CROSS-REFERENCE TO RELATED APPLICATION

This application claims priority to German Patent Application No. 10 2022 112 186.0, filed May 16, 2022, the content of such application being incorporated by reference herein in its entirety.

FIELD OF THE INVENTION

The invention relates to a brake system for a motor vehicle, in particular to a brake-by-wire brake system, which provides haptic feedback to the driver via the brake pedal in the event of an anti-lock braking. The invention further relates to a motor vehicle having a brake system according to aspects of the invention and a method of operating a brake system according to aspects of the invention.

BACKGROUND OF THE INVENTION

A brake system of a motor vehicle in which the brake pedal is mechanically and hydraulically decoupled from a braking apparatus that generates the actual brake pressure is referred to as a brake-by-wire brake system. The braking request by the driver, which he expresses by actuating a brake pedal, is usually received by a hydraulic brake simulator and converted into an electrical signal. Using the signal, the brake pressure is generated by a separate hydraulic system.

These brake systems typically have only the communication direction from the brake pedal to the braking apparatus. Therefore, information cannot be transmitted from the braking apparatus to the brake pedal and thus to the driver. In conventional systems, i.e. brake systems that work with a classical braking force intensifier (that is, not brake-by-wire systems), dependent upon the technology used, feedback to the brake pedal in the form of a vibration/pulsing of the pedal is given to the driver when the anti-blocking system engages in the braking (anti-lock braking). On the basis of this information, the driver can adjust his driving style to the road conditions.

In order to counteract this problem, various possibilities have been developed in the prior art. DE 10 2018 220 544 B4, which is incorporated by reference herein, discloses a brake system of a motor vehicle, wherein the brake system includes a wheel brake cylinder, a brake pedal, a master brake cylinder, a master brake cylinder circuit, a primary braking unit and a secondary braking unit having a further pressure generating unit, wherein, in the case of a traction loss during an anti-lock braking via the further pressure generating unit, a pulsation in the master brake cylinder circuit is generated to provide a feedback to the brake pedal.

DE 10 2018 220 578 A1 and U.S. Ser. No. 10/479,335 B2, which are incorporated by reference herein, disclose a brake system for a motor vehicle, the brake system comprising a pedal feel simulation apparatus which is in communication with a master brake cylinder such that feedback is provided to a brake pedal and to the driver in the event of anti-lock braking.

DE 10 2017 214 828 A1, which is incorporated by reference herein, discloses a brake system of a motor vehicle, with an anti-lock brake system and a simulator valve, wherein an ABS pedal feel is generated by alternating opening and closing operations of the simulator valve.

DE 10 2017 213 620 A1, which is incorporated by reference herein, discloses a brake system for a motor vehicle, wherein the brake system comprises a brake pedal and a braking apparatus mechanically and/or hydraulically decoupled from the brake pedal, wherein the brake pedal is coupled to a pressure unit, and wherein feedback is provided to the brake pedal via the pressure unit when an anti-lock brake system is activated.

US 2018/257613 A1, which is incorporated by reference herein, discloses a brake system having a brake feedback control device for tactile, acoustic, and/or optical feedback to the brake pedal.

US 2017/225664 A1, which is incorporated by reference herein, discloses a brake-by-wire brake system, wherein feedback of an anti-lock braking operation is provided by a pulsation on the pedal.

DE 10 2013 222 281 A1, which is incorporated by reference herein, discloses a method for haptic information to a driver of a motor vehicle equipped with a brake-by-wire brake system, wherein a brake pedal feedback is performed by means of a release valve at the start of an anti-lock control process or an electronic braking force distribution function.

DE 10 2013 204 778 A1, which is incorporated by reference herein, discloses a method for haptic information to the driver of a motor vehicle equipped with a brake-by-wire brake system regarding the operating state of the brake system, in which the brake pedal characteristic in the form of a functional relation between the brake pedal opposing force and the brake pedal travel is generated by a simulator and modified dependent upon the operating state, wherein a base braking pedal characteristic is generated by means of a passive simulator spring.

DE 10 2012 025 247 A1 and EP 1 864 875 B1, which are incorporated by reference herein, disclose further embodiments of a brake system with a device for haptic feedback of a braking operation on the brake pedal.

SUMMARY OF THE INVENTION

The brake system according to aspects of the invention for a motor vehicle has a brake pedal configured to receive a braking request from a driver driving the motor vehicle and to forward it to a braking apparatus, wherein the braking apparatus is configured to translate the braking request into a corresponding brake pressure and to transmit it to brake actuators, wherein the brake pedal is further mechanically and/or hydraulically decoupled from the braking apparatus. The brake system further has at least one mechanical actuator in the form of a unbalance motor and/or a magnetic plunger in communication with the brake pedal and configured to vibrate the brake pedal in the event of an anti-lock braking.

On the basis of the mechanical actuator in the form of a unbalance motor or a magnetic plunger, which are preferably attached directly to the brake pedal, a structurally comparatively simple possibility can be provided to ensure a haptic feedback on the pedal.

The term magnetic plunger should be understood to mean an electromagnet which can move a plunger, in the simplest case an iron rod, back and forth in one direction between two different positions, similarly to the principle of operation of a magnetic valve. If the latter strikes, for example, against the brake pedal in one of the two positions, the pedal can be set into vibration if the plunger moves sufficiently rapidly between the two positions.

Also conceivable is an embodiment with a magnetic plunger in which said plunger is fastened to the brake pedal and the vibration is generated solely by means of the inertia of the mass of the plunger without the plunger striking against the pedal. This requires that the plunger has a sufficiently large mass.

A unbalance motor (also referred to as a vibratory motor or an oscillation motor) is a motor, usually an electric motor, on the output shaft of which an eccentric mass is arranged. Through the operation of the motor, by means of the eccentric mass on the shaft, centrifugal forces arise which cause the motor or objects in contact with the eccentric mass to vibrate. Unbalance motors are known, for example, in the field of vibratory conveying technology and exist in various strengths and designs. What is involved is therefore a standard part that is relatively easy to integrate.

In an advantageous embodiment of the invention with a unbalance motor, said unbalance motor has an adjustable unbalance. The intensity of the vibration can be adjusted by means of the adjustable unbalance. Alternatively or additionally, two or more unbalance motors can be provided which have different unbalances. Thus, in embodiments with a plurality of motors, the intensity of vibration can be adjusted by operating the unbalance motors at different unbalances. By operating unbalance motors simultaneously with different unbalances (potentially at different speeds), an overlaying of the vibration and thus a further form of vibration can be produced.

Therefore, embodiments of the invention with a unbalance motor are contemplated in which a unbalance motor with unadjustable unbalance, two or more unbalance motors with unadjustable unbalance, a unbalance motor with adjustable unbalance, and a plurality of unbalance motors, of which at least one comprises an adjustable unbalance, are provided in the brake system.

The unbalance is therein composed of two variables. These are, firstly, the size of the eccentric mass and, secondly, the eccentricity of the mass. The eccentricity is to be understood to be the separation of the mass from the output shaft of the electric motor. This separation can be, for example, adjustable so that the unbalance is changeable. If the separation of the mass from the shaft is increased, the eccentricity increases. In the opposite case, it decreases.

The advantage of embodiments with adjustable unbalance is that the intensity, i.e. the strength, of the vibration transmitted to the brake pedal can be adjusted. Thus, the driver can be provided with feedback as to how strongly the anti-lock braking takes place. Using a plurality of unbalance motors with mutually different unbalances, different intensities can also be transmitted to the brake pedal and thus the feedback can be communicated to the driver in a differentiated manner.

In a further advantageous embodiment of the invention, the at least one mechanical actuator is configured to apply varying frequency and/or intensity to the brake pedal, depending upon the strength of the anti-lock braking. Alternatively or additionally, the actuator is also configured to apply vibration to the brake pedal in packages (vibration packages). Differentiated feedback regarding the strength of the engagement of the anti-lock brake system (ABS) can be provided to the driver via the brake pedal by means of different operating options in terms of frequency, intensity and vibration packets.

As already described above, different intensities can be achieved in the case of unbalance motors via different unbalances. In embodiments with magnetic plungers, vibrations of varying intensity can be achieved by means of the speed of the plunger as it changes from one position to the other.

The frequency of the vibration is understood to mean how many oscillations per second are transmitted to the brake pedal. The frequency can thus be adjusted by the rotary speed of the unbalance motor or by the frequency of the movements per second of the plunger between the two positions in the case of the magnetic plunger.

The expression "applying the vibration in packets" should be understood to mean that over a particular period of time, the brake pedal is set into vibration, followed by a particular period of time when no vibration is transmitted, although anti-lock braking is in progress. Information can also be communicated to the driver by switching between the periods of vibration and no vibration. In the context of this application, the packets of vibrations separated by the pauses are to be understood as vibration packets. For example, with strong ABS interventions in the braking, merely small pauses can be provided between the vibration packets, whereas in a small ABS intervention, the pauses are significantly longer.

In a further advantageous embodiment of the invention, the brake system has a braking force simulator, wherein the at least one mechanical actuator is integrated into the braking force simulator. Braking force simulators in vehicle brake systems are often configured as hydraulic cylinders, wherein a piston guided in the hydraulic cylinder displaces fluid situated in the hydraulic cylinder by means of a coupling to the brake pedal. An exemplary embodiment of a braking force simulator in which the mechanical actuator is integrated would be, for example, if the actuator acts directly upon the piston. By means of the connection between the brake pedal and the piston, the vibration is transferred to the brake pedal.

In an alternative embodiment of the invention to the embodiment described in the previous paragraph, the at least one mechanical actuator is arranged directly on the brake pedal. This should be understood to mean that the at least one mechanical actuator is fastened to the brake pedal or the eccentric mass or the plunger directly contact the brake pedal. Thereby, a relatively simple implementation of the feedback and a direct influence of the actuator on the brake pedal can be ensured.

Preferably, the brake system according to aspects of the invention comprises a brake control device for controlling the braking apparatus, wherein the at least one mechanical actuator is also controlled by the brake control device. The brake control device is therein also responsible for the ABS control of the brake control unit. Thus, no further control device is required for controlling the at least one mechanical actuator and a compact and effective system is ensured.

A further advantageous embodiment of the invention provides that in the event of an anti-lock braking, in addition to the vibration in the pedal, an acoustic signal is output via an audio system of the motor vehicle and/or an optical signal is output, in particular via an instrument cluster of the motor vehicle and/or via a head-up display of the motor vehicle. This requires that the brake system can access these output instruments and the system and/or can pass on corresponding information.

By means of the additional warnings via acoustic and optical signals, the feedback and information transmission from the brake system to the driver can be further improved, in addition to the haptic feedback via the brake pedal, and thus the driving safety can be further enhanced.

The method according to aspects of the invention for operating a brake system according to aspects of the invention includes the method step that in the event of anti-lock braking, the at least one mechanical actuator is actuated to induce vibration in the brake pedal.

Preferably, in the event of anti-lock braking, in addition to the vibration in the pedal, an optical signal, in particular via an indication in a head-up display and/or in an instrument cluster, and/or an acoustic signal, in particular via an audio system of the motor vehicle, is output to the driver. As already described, the feedback and information forwarding from the brake system to the driver can be further improved, in addition to the haptic feedback via the brake pedal, by means of the additional warnings via acoustic and optical signals and thus the driving safety can be further enhanced.

In a further advantageous embodiment of the method according to aspects of the invention, the at least one mechanical actuator is operated with a variable frequency and/or intensity and/or in vibration packets according to the strength of the anti-lock braking. Thus, as explained in detail above, the strength of the ABS intervention can also be reported back to the driver.

The motor vehicle according to aspects of the invention has a brake system according to aspects of the invention.

BRIEF DESCRIPTION OF THE DRAWINGS

Various aspects and embodiments of the invention will be explained in more detail below making reference to the accompanying drawings. In the drawings.

DETAILED DESCRIPTION OF THE INVENTION

Figure 1:
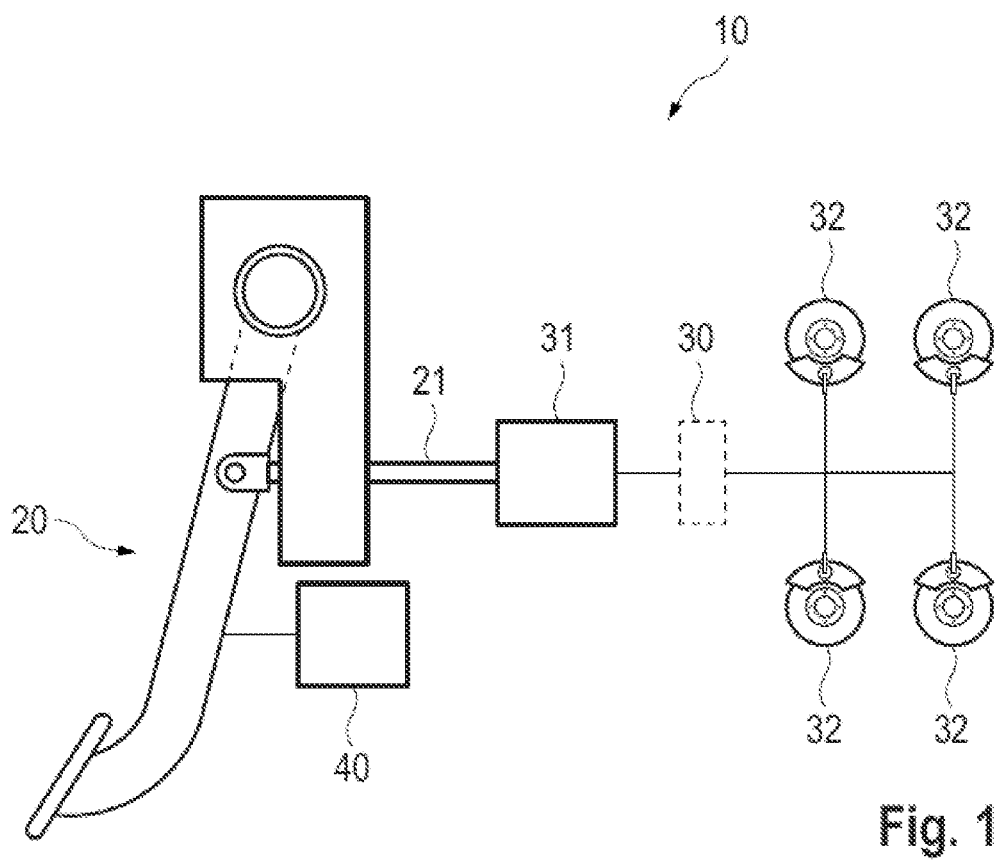
FIG. 1 shows a schematic representation of the brake system according to aspects of the invention.

FIG. 1 shows a schematic representation of the brake system 10 according to aspects of the invention. Said brake system has a brake pedal 20, which in the embodiment shown is in communication with a braking force simulator 31 via a mechanical connection 21. The braking force simulator 31 converts the braking request expressed by a driver of a motor vehicle having the corresponding brake system 10 via the actuation of the brake pedal 20 into a corresponding electrical signal. The electrical signal, in turn, is converted by the braking apparatus 30 into a brake pressure provided by way of a hydraulic pressure line to brake actuators 32 on wheels of the motor vehicle. In the context of this application, the brake simulator 31 should be understood as being already a part of the braking apparatus 30. The brake actuators are designed to reduce the velocity of the motor vehicle.

Furthermore, the brake system 10 has a mechanical actuator 40 which is configured to induce the brake pedal 20 to vibrate during an ABS engagement in the braking. The mechanical actuator 40 is either a unbalance motor or a magnetic plunger in the sense described above. In one embodiment of the invention, the mechanical actuator 40 is directly attached to the brake pedal 20, for example screwed onto it, so that a vibration of the mechanical actuator 40 itself is transferred to the brake pedal 20. Such an embodiment is conceivable both for embodiments with magnetic plungers and also with unbalance motors.

In embodiments with a unbalance motor, said motor is vibrated by the centrifugal forces and the inertia of the eccentric mass of the unbalance motor, wherein by means of the rigid connection between the unbalance motor and the brake pedal 20, the pedal is also caused to vibrate. The greater the eccentricity, mass, and/or speed of the motor, the greater is the intensity of the vibration.

In embodiments of the invention with a magnetic plunger, the vibration can be caused by the movement of the plunger from one position to the other and the associated movement of the mass of the pusher, or by abutting the plunger against the brake pedal 20.

Alternatively to the fastening directly onto the brake pedal 20, the mechanical actuator 40 can, for example, also be connected, in an alternative embodiment, to the connection 21 and integrated in the brake simulator 31. Any arrangement of the mechanical actuator 40 in which a vibration transmission to brake pedal 20 is possible is conceivable.

Figure 2:
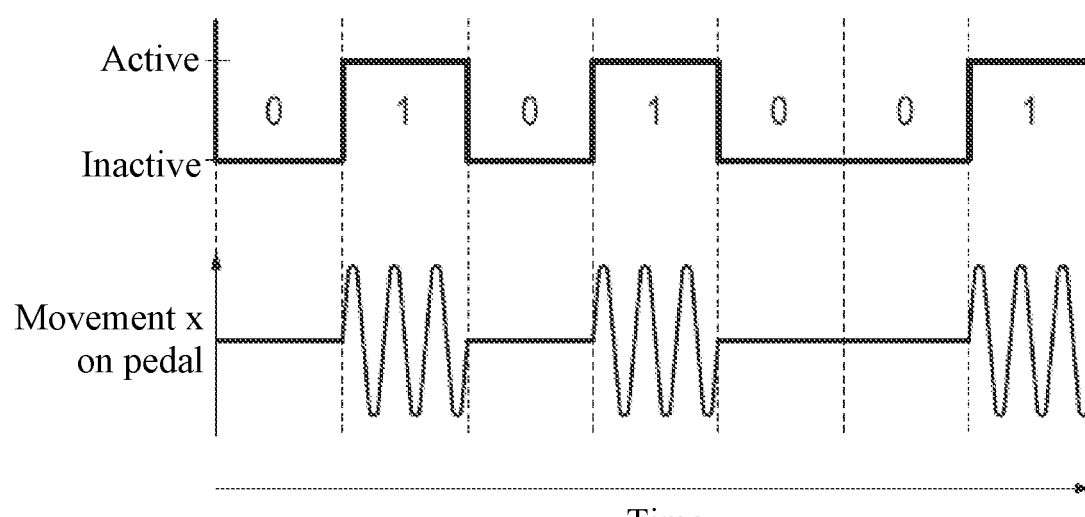
FIG. 2 illustrates one embodiment of the operating strategy of the mechanical actuator.

FIG. 2 shows an exemplary operating strategy of the brake system 10 with a unbalance motor as the mechanical actuator 40. Two graphical representations are shown, with the upper plot indicating whether or not the unbalance motor is activated at any given time point, and the lower plot indicating the movement x at the brake pedal 20 (pedal) over time caused by the unbalance motor. Activation of the unbalance motor occurs during an ABS engagement in the braking.

If the unbalance motor is activated (state 1 in the upper plot), a movement x of the brake pedal 20 is induced by the centrifugal force of the unbalance. The movement x thereby fluctuates around a zero point that is defined as the position of the brake pedal 20 with the unbalance motor inactive. With correspondingly fast movement x between maximum and minimum, i.e. with correspondingly high rotary speed of the unbalance motor, the movement of the brake pedal 20 is perceived by the driver as a vibration.

From FIG. 2 it is clear that the active phases and the inactive phases, indicated by the dashed lines, are of the same length. The movement x of the brake pedal 20 during an active phase of the unbalance motor is understood as a vibration packet. By varying the timing of the vibration packets with different lengths of pauses between them, information about the intensity of the ABS intervention can be communicated to the driver. In the case of strong anti-lock braking, multiple vibration packets can be arranged sequentially and just a few pauses provided therebetween. Accordingly, during lighter engagements, only a few vibration packets occur sequentially, which are separated by long pauses (a plurality of inactive phases of the unbalance motor).

Thus, in the exemplary embodiment shown, as mentioned, the intensity, i.e. the strength of the vibration, as well as the frequency of movement x and thus the vibration on the brake pedal 20 are not adjusted, but rather the information regarding the strength of the ABS intervention is passed on via the sequence of the vibration packets.

Naturally, other embodiments are possible in which the rotary speed of the unbalance motor and thus the frequency of the vibration and/or the eccentricity of the unbalance mass and thus the intensity of the vibration is variable.

Also in embodiments with a magnetic plunger, an adjustment of the frequency by means of the number of position changes of the plunger per second, as well as an adjustment of the intensity of the vibration by means of the speed of the position change of the plunger are possible. The passing on of information regarding the above-described vibration packets is also possible for the magnetic plunger.

LIST OF REFERENCE NUMBERS

10 Brake system
20 Brake pedal

21 Connection
30 Braking apparatus
31 Braking force simulator
32 Brake actuator
40 Mechanical actuator

What is claimed is:

1. A brake system for a motor vehicle, said brake system comprising:
    a brake pedal configured to receive a braking request from a driver driving the motor vehicle and to forward the braking request to a braking apparatus, wherein the braking apparatus is configured to translate the braking request into a corresponding brake pressure and to transmit the brake pressure to brake actuators,
    wherein the brake pedal is mechanically and/or hydraulically decoupled from the braking apparatus, and wherein the brake system has at least one mechanical actuator in the form of an unbalance motor and/or a magnetic plunger, and
    wherein the at least one mechanical actuator is in communication with the brake pedal and is configured to induce the brake pedal to vibrate in the event of an anti-lock braking,
    wherein the at least one mechanical actuator is configured to apply the vibrations in successive vibration packets, which successive vibration packets are separated by pauses, wherein the successive vibration packets each comprises a plurality of successive pulses in the form of a continuous sinusoidal wave pattern, and wherein a frequency of the successive pulses for each vibration packet is greater than a frequency of the successive vibration packets,
    wherein a time duration of each pause between two successive vibration packets is a function of a strength of the anti-lock braking during the anti-lock braking event.

2. The brake system according to claim 1, wherein the unbalance motor comprises an adjustable unbalance, and/or at least two unbalance motors having a different unbalance.

3. The brake system according to claim 1, wherein the brake system has a braking force simulator and the at least one mechanical actuator is integrated within the braking force simulator.

4. The brake system according to claim 1, wherein the at least one mechanical actuator is arranged directly on the brake pedal.

5. The brake system according to claim 1, wherein the brake system comprises a brake control device for controlling the braking apparatus, and the at least one mechanical actuator is also actuated by the brake control device.

6. The brake system according to claim 1, wherein the brake system is further configured, in the event of an anti-lock braking, in addition to the vibration in the brake pedal, to output an acoustic signal via an audio system of the motor vehicle and/or to output an optical signal via an instrument cluster of the motor vehicle and/or a head-up display of the motor vehicle.

7. A motor vehicle comprising the brake system according to claim 1.

8. The brake system according to claim 1, wherein the frequency of the successive pulses for each vibration packet is the same for each pulse, and wherein an amplitude of the successive pulses for each vibration packet is the same for each pulse.

9. The brake system according to claim 1, wherein the unbalance motor comprises at least two unbalance motors having a different unbalance, and wherein the at least two unbalance motors are operated simultaneously.

10. The brake system according to claim 1, wherein an amplitude of the successive pulses for each vibration packet is a function of a strength of the anti-lock braking during the anti-lock braking event.

11. The brake system according to claim 1, wherein the at least one mechanical actuator comprises two unbalance motors having different unbalances.

12. A method for operating a brake system of a motor vehicle, wherein a brake pedal of the motor vehicle is mechanically and/or hydraulically decoupled from a braking apparatus, and wherein the brake system has at least one mechanical actuator in the form of a unbalance motor and/or a magnetic plunger, wherein the at least one mechanical actuator is in communication with the brake pedal, the method comprising:
    receiving a braking request from a driver at a brake pedal of the motor vehicle;
    forwarding the braking request to the braking apparatus;
    translating the braking request into a corresponding brake pressure;
    transmitting the brake pressure to brake actuators of the motor vehicle; and
    inducing the brake pedal to vibrate in the event of an anti-lock braking, said inducing comprising applying vibrations in successive vibration packets using the at least one mechanical actuator, which successive vibration packets are separated by pauses, wherein the successive vibration packets each comprises a plurality of successive pulses in the form of a continuous sinusoidal wave pattern, wherein a frequency of the successive pulses for each vibration packet is greater than a frequency of the successive vibration packets, and wherein a time duration of each pause between two successive vibration packets is a function of a strength of the anti-lock braking during the anti-lock braking event.

13. The method according to claim 12, wherein, in the event of an anti-lock braking, in addition to inducing vibration in the brake pedal, the method further comprises outputting to the driver (i) an optical signal via an indication in a head-up display and/or in an instrument cluster, and/or (ii) an acoustic signal via an audio system of the motor vehicle.

14. The method according to claim 12, wherein the frequency of the successive pulses for each vibration packet is the same for each pulse, and wherein an amplitude of the successive pulses for each vibration packet is the same for each pulse.

15. The method according to claim 12, wherein the unbalance motor comprises at least two unbalance motors having a different unbalance, and wherein the at least two unbalance motors are operated simultaneously.

16. The method according to claim 12, wherein an amplitude of the successive pulses for each vibration packet is a function of a strength of the anti-lock braking during the anti-lock braking event.

17. The method according to claim 12, wherein the at least one mechanical actuator comprises two unbalance motors having different unbalances.

* * * * *